Figure 1:
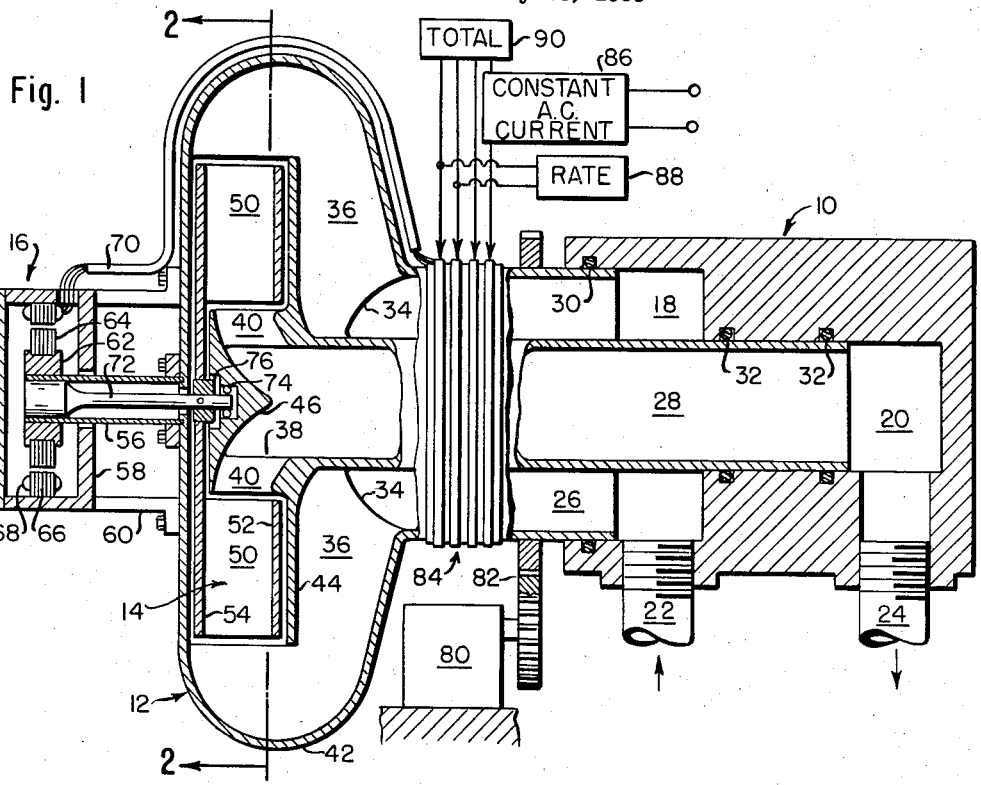

March 17, 1959

H. A. POWERS 2,877,649

CORIOLIS MASS FLOWMETER

Filed July 14, 1955

INVENTOR.
HOWARD A. POWERS
BY
*Kenway, Jenney, Witter & Hildreth*
ATTORNEYS

United States Patent Office 2,877,649
Patented Mar. 17, 1959

2,877,649

CORIOLIS MASS FLOWMETER

Howard A. Powers, Medfield, Mass., assignor, by mesne assignments, to American Radiator & Standard Sanitary Corporation, New York, N. Y., a corporation of Delaware Application July 14, 1955, Serial No. 522,062

4 Claims. (Cl. 73—194)

This invention relates to flowmeters for measuring the mass rate of fluid flow and comprises a novel meter in which the Coriolis forces exerted by a fluid subjected to a tangential acceleration are measured. Meters of this type are described in general in the copending application of Roby B. White, Serial No. 442,351 filed July 9, 1954, now Patent No. 2,832,218, issued April 29, 1958.

In a Coriolis mass flowmeter of this type, the fluid is subjected to a tangential acceleration in a whirling impeller through which the fluid is flowed radially outward. The Coriolis force of the accelerating fluid may be measured to give an indication of the mass flow rate, and this is conveniently accomplished by measuring the torque exerted by the fluid on the impeller.

The torque on the impeller, it has now been found, is not necessarily a function of only the Coriolis forces unless the impeller is so designed that the fluid flowing through it enters and leaves in a radial direction relative to the impeller. Slight deviations from the radial direction of the fluid entering or leaving the impeller may cause large errors in the mass flow measurement. Since the impeller is generally designed to accommodate flow rates greatly in excess of the lowest rates encountered, at which the impeller may be only partly filled with fluid, the fluid may under these conditions in impellers heretofore developed deviate markedly from a truly radial flow path, and cause unreliable operation of the meter.

The object of the present invention is to provide for proper radial flow through the impeller of a Coriolis type flow meter, and thereby to increase its reliability and accuracy over a wide range of flow rates. In addition, a flowmeter of the type provided by this invention may be constructed in small, light models suitable for installation where size and weight are of prime importance.

In general, the flowmeter of this invention consists of a casing formed with an impeller which is mounted to rotate about its axis. The fluid is flowed radially through the impeller and accelerated tangentially therein to develop Coriolis forces which are exerted against the impeller. The torque on the impeller provides a measure of this force and correspondingly, a measure of the mass flow rate.

An important feature of this invention is the provision of channelling means at the inlets to the radial channels to impart to the fluid a tangential velocity substantially equal to the tangential velocity of the inlets, and of means restricting the fluid leaving the channels to flow entirely in a radial path relative to the impeller.

These features assure the fluid entering and leaving the impeller of a velocity of $\Omega R_1$ and $\Omega R_2$ respectively, where $\Omega$ is the angular velocity of the impeller, $R_1$ is the radius of the impeller at the inlet end and $R_2$ is the radius at the outlet end. Under these conditions, the torque on the impeller exerted by the fluid, represented generally by the equation (1) $$T=\frac{dm}{dt}(R_2C_2-R_1C_1)$$

where $$\frac{dm}{dt}$$

is the mass rate of flow and $C_2$ and $C_1$ are respectively the outlet and inlet tangential absolute velocities of the fluid, reduces to (2) $$T=\frac{dm}{dt}\Omega(R_2^2-R_1^2)$$

Equation 2 describes the torque applied by the Coriolis forces in the fluid, which will be seen to be a reliable measure of the instantaneous mass rate of flow, since the independent variables $C_2$ and $C_1$ are eliminated.

Additional features of this invention, described in detail below and claimed in the appended claims relate to details of construction and combinations of parts by which a simple yet reliable meter is provided.

Figure 2:
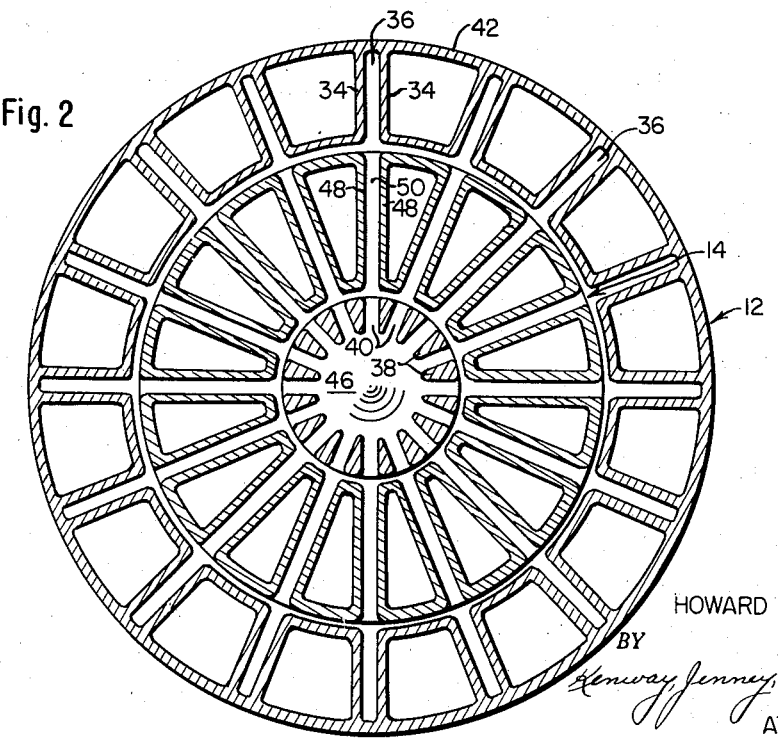

These and other objects and features of my invention along with incident advantages will be better understood and appreciated from the following description of one embodiment thereof selected for purposes of illustration and shown in the accompanying drawing in which:

Fig. 1 is a view in longitudinal cross-section of a flowmeter constructed in accordance with my invention, and Fig. 2 is a cross-section taken along section line 2—2 of Fig. 1.

The preferred embodiment of my invention includes in its general organization a housing 10, a principal impeller 12, and a concentric secondary or sensing impeller 14. The principal and sensing impellers 12 and 14 are driven by the same power source and rotate about a common axis, while the relative angular displacement of the two impellers is measured by a dynamo transformer 16.

The housing 10 serves to direct fluid to and from the impellers 12 and 14 and is formed with concentric stepped chambers 18 and 20 which receive concentric rotatably mounted inlet and outlet ducts 26 and 28 leading to and from the impellers. Seals 30 and 32 between the ducts and chambers provide fluid-tight joints between them.

The principal impeller 12 includes a casing 42 which merges with the inlet duct 26 and the outlet duct 28 extends from the interior of the principal impeller casing 42 through the inlet duct 26. The inner end of the outlet duct 28 within the impeller casing 42 supports a vertical annular wall 44 which directs incoming fluid toward the periphery of the casing. A row of vanes 34 extends between the wall 44 and the inlet side of the casing 42 and defines a number of radial channels 36 in the path of fluid entering the casing through the inlet duct 26. The outer radial portions of the channels 36 cooperate with the casing 42 to direct the fluid radially into the sensing impeller 14 which lies on the other side of the wall 44. A second annular row of vanes 38 connected to the inner radial portion of the wall 44 and a hub 46 define a row of radial channels 40 smoothly merging into the outlet duct 28. The channels 36 and 40 each form part of the principal impeller.

The sensing impeller 14 lies between the channels 40 and the outer radial portion of the channels 36. The sensing impeller 14 includes a pair of vertical plates 52 and 54 which support a single annular row of vanes 48. The vanes 48 define a number of radial channels 50 in the path of fluid flowing from the channels 36 to the channels 40.

Before proceeding further with the description of the meter, it should be noted that the channels 36, 40, and 50 are defined by vanes grouped in pairs and are in the form of narrow channels of uniform tangential width. As a result, the fluid caught up in the vanes 34 and directed through the channels 36 attains the tangential velocity of the impeller. The very small tangential width of the channels 36 prohibits fluid from acquiring a component of tangential velocity relative to the impeller. The same is true for the channels 40 and 50 of the principal and sensing impellers, respectively.

The dynamo transformer 16 responds to angular displacement of the sensing impeller 14 relative to the principal impeller 12. A spider 60 screwed to the impeller casing 42 carries the housing 58 of the transformer 16. A torque tube 56, also screwed to the casing 42, extends through the spider and terminates within the transformer housing 58. The terminal portion of the torque tube 56 carries a rotor hub 62 which in turn supports a transformer rotor 64. Both exciting and pick-up windings, generally designated by numeral 68, are wound about a stator 66 mounted on the inner walls of the transformer housing 58, surrounding the rotor 62. The details of the transformer, fully described in the patent to Mueller, No. 2,488,734, issued November 22, 1949, form no part of this invention.

A torque rod 72 coaxial with the torque tube 56 is supported at one end by a bearing 74 carried by the principal impeller hub 46. The other end of the rod 72 is secured to the inner surface of the torque tube 56 adjacent the transformer rotor hub 62 while the intermediate portion of the torque rod 72 is coupled to a block 76 embedded in the plate 54 of the sensing impeller. The torque rod supports and drives the sensing impeller 14 concentrically with the principal impeller 12. The manner in which this is accomplished will be described below.

A constant speed motor 80 through a gear 82 mounted on the duct 26 rotates the principal impeller 12 including the vanes 34 and 38, the hub 46, the outlet duct 28 and the wall 44 about the impeller axis. The transformer casing 58 rotates with the principal impeller 12, as does the torque tube 56. The torque rod 72, connected to the tube 56, also rotates, thus driving the sensing impeller 14 with the principal impeller. The torque tube 56 and the torque rod 72 are flexible and permit a limited phase shift of the sensing impeller relative to the principal impeller 12. The phase shift of the sensing impeller is reflected in the dynamo transformer as displacement of the rotor 64, by the twisting of the torque tube in response to the torque applied to it by the rod 72. The transformer 16 produces a signal proportional to the angular displacement of the rotor 64, and a cable 70 connected to the pick-up coils 68 wound about the transformer stator 66 transmits the signal to a slip ring assembly 84 mounted on the duct 26. The cable 70 also carries a signal from a constant A. C. current source 86 to the exciting coils for energizing the transformer 16. A rate meter 88 in the nature of a voltmeter is connected to the slip ring assembly 84 and indicates the instantaneous signal produced by the transformer. A second meter 90, which may take the form of a watt-hour meter, integrates that signal with respect to time and records the total flow. The meter 90, like the transformer 16, is energized from the constant A. C. current source 86.

Following the above detailed description of the components of the flowmeter is an explanation of their operation. The inlet and outlet pipes 22 and 24 are connected into a line (not shown) carrying the fluid whose mass flow is to be measured, and the motor 80 is energized. The fluid entering the meter through the pipe 22 flows into the chamber 18 and then flows axially through the enlarged inlet duct 26 into the impeller casing 42. As the fluid enters the casing 42, it is caught up in the rotating radial channels 36 of the principal impeller and is directed radially outward to the periphery of the casing, where it turns axially over the sensing impeller 14. The very limited tangential width of the channels 36 prevents the fluid from acquiring a component of tangential velocity relative to the principal impeller 12. The sensing impeller 14 which rotates with the principal impeller receives the fluid in its channels 50 from the channels 36. As the fluid crosses the interface of the principal impeller and the outer radial edge of the sensing impeller it rotates at the angular velocity of the outer radial edges of the sensing impeller channels 50, and, therefore, $C_1$ equals $\Omega R_1$. Thus, one of the requirements for maintaining total torque equal to Coriolis torque is satisfied. Continued flow through the narrow channels 50 causes constant tangential deceleration of fluid, thus preserving the purely radial flow of fluid relative to the sensing impeller, and $C_2$ equals $\Omega R_2$. Under these conditions, the torque exerted on the sensing impeller by the tangentially decelerating fluid is directly proportional to $$\frac{dm}{dt}$$

the mass rate of fluid flow. The force exerted by the fluid in response to the tangential deceleration manifests itself in a displacement of the sensing impeller 14 relative to the principal impeller 12. A signal is produced by the transformer 16 directly proportional to the displacement, which in turn is directly proportional to the mass flow rate of the fluid. The signal is indicated at the rate meter 88 and total flow is recorded by the meter 90 which integrates the signal with respect to time.

After the fluid has crossed the sensing impeller 14, it flows back to its line through the channels 40, the outlet duct 28, the passage 20, and the outlet pipe 24.

From the foregoing description of the components of the meter and its operation, those skilled in the art will appreciate that in addition to great accuracy, the instrument has many other advantages. For example, the inlet and outlet passages 26 and 28, the seals 30 and 32, the motor 80, and the slip ring assembly 84 conveniently are situated at the same location. The dynamo transformer 16 is accessible easily so that fine adjustments may be made without disassembling the meter.

Although throughout the description of the illustrated embodiment of my invention the flow path has been defined as radially outward through the channels 36 and radially inward through the channels 40 and 50, it is to be understood that the direction of flow may be reversed whenever desired. If a fluid containing entrained gas bubbles or other light inclusions is measured, accuracy is enhanced by directing the fluid radially inward through the sensing impeller so that the centrifugal force and the pressure head act in the direction of flow to move the inclusions through the channels 50. If fluid containing suspended solids or other heavy inclusions is to be measured, the direction of flow is advantageously reversed to obtain the same results.

Although the invention is described with reference to its preferred embodiment it is contemplated that numerous modifications will be apparent to those skilled in the art and that such may be made without departing from the scope of the invention.

What I claim as new and desire to secure by Letters Patent of the United States is:

1. A fluid flow measuring device comprising an impeller rotatable about an axis and having narrow fluid passages extending radially therethrough each being of uniform tangential width, a housing member enclosing said impeller including an inlet channel and an outlet channel communicating with said fluid passages, radial vanes within said inlet channel adjacent to one end of said fluid passages, said vanes being rotatable coaxially with said impeller and having edge portions closely adjacent to each other and closely spaced from the ends of said fluid passages to define narrow inlet passages leading to said fluid passages, means for rotating said impeller and said vanes at the same substantially constant speed, and means for measuring the torque of said impeller created by the Coriolis force of the fluid flowing through it, said measuring means being an indication of the mass rate of fluid flow in the device herein defined.

2. A fluid flow measuring device comprising a sensing impeller rotatable about an axis and having narrow fluid passages extending radially therethrough each being of uniform tangential width, a housing member enclosing said impeller including an inlet channel and an outlet channel communicating with said fluid passages, radial inlet vanes within said inlet channel adjacent to one end of said fluid passages, said inlet vanes being rotatable coaxially with said impeller and having edge portions closely adjacent to each other and closely spaced from the ends of said fluid passages to define narrow inlet passages leading to said fluid passages, radial outlet vanes within said outlet channel adjacent to the other end of said fluid passages, said outlet vanes being rotatable coaxially with said impeller and having edge portions closely adjacent to each other and closely spaced from the ends of said fluid passages to define narrow outlet passages leading from said fluid passages, means for rotating said impeller, said inlet vanes and said outlet vanes at substantially the same speed, and means for measuring the torque of said impeller created by the Coriolis force of the fluid flowing through it, said measuring means being an indication of the mass rate of fluid flow in the device herein defined.

3. A fluid flow measuring device comprising a sensing impeller rotatable about an axis and having narrow fluid passages extending radially therethrough each being of uniform tangential width, a housing member enclosing said impeller including an inlet channel and an outlet channel communicating with said fluid passages, a second impeller rotatable coaxially with said sensing impeller including radial inlet vanes within said inlet channel and radial outlet vanes within said outlet channel, said inlet vanes being adjacent to one end of said fluid passages and having edge portions closely adjacent to each other and closely spaced from the ends of said fluid passages to define narrow inlet passages leading to said fluid passages, said outlet vanes being adjacent to the other end of said fluid passages and having edge portions closely adjacent to each other and closely spaced from the ends of said fluid passages to define narrow outlet passages leading from said fluid passages, means for rotating said sensing impeller and said second impeller at substantially the same speed, and means for measuring the torque of said sensing impeller created by the Coriolis force of the fluid flowing through it, said measuring means being an indication of the mass rate of fluid flow in the device herein defined.

4. A fluid flow measuring device comprising a sensing impeller rotatable about an axis and having narrow fluid passages extending radially therethrough each being of uniform tangential width, a housing member enclosing said impeller including an inlet channel and an outlet channel communicating with said fluid passages, a second impeller rotatable coaxially with said sensing impeller including radial inlet vanes within said inlet channel and radial outlet vanes within said outlet channel, said inlet vanes being adjacent to one end of said fluid passages and having edge portions closely adjacent to each other and closely spaced from the ends of said fluid passages to define narrow inlet passages leading to said fluid passages, said outlet vanes being adjacent to the other end of said fluid passages and having edge portions closely adjacent to each other and closely spaced from the ends of said fluid passages to define narrow outlet passages leading from said fluid passages, yieldable means connecting said impellers and restraining relative angular movement of said impellers about said axis, means for rotating said sensing impeller and said second impeller, and means for measuring the relative angular displacement between said impellers, said measuring means being an indication of the mass rate of fluid flow in the device herein defined.

References Cited in the file of this patent

FOREIGN PATENTS 925,622    Germany _____ Mar. 24, 1955

OTHER REFERENCES

A publication entitled, Mass-Flow-Rate Indicator, on page 348, of Instruments, vol. 26, March 1953.

A publication entitled, A Fast-Response True-Mass-Rate Flowmeter, by Yao Tzu Li and Shih-Ying Lee, pages 835 to 841 of the July 1953, Transactions of the ASME.